United States Patent
Lidow et al.

(10) Patent No.: US 10,872,355 B2
(45) Date of Patent: Dec. 22, 2020

(54) CONTROLLING USER DATA VISIBILITY IN ONLINE AD AUCTIONS

(71) Applicant: Xandr Inc., New York, NY (US)

(72) Inventors: Arel Ives Lidow, New York, NY (US); Scott Daniel Menzer, Randolph, NJ (US)

(73) Assignee: Xandr Inc., New York, NY (US)

( * ) Notice: Subject to any disclaimer, the term of this patent is extended or adjusted under 35 U.S.C. 154(b) by 188 days.

(21) Appl. No.: 14/746,304

(22) Filed: Jun. 22, 2015

(65) Prior Publication Data

US 2016/0371748 A1 Dec. 22, 2016

(51) Int. Cl.
*G06Q 30/02* (2012.01)

(52) U.S. Cl.
CPC ................ *G06Q 30/0275* (2013.01)

(58) Field of Classification Search
CPC .......... G06Q 10/063114; G06Q 10/06; G06Q 30/08; G06Q 10/06311; G06Q 40/04; G06Q 10/063; G06Q 10/0639; G06Q 10/06375; G06Q 40/12; G06Q 10/063112; G06Q 10/06316; G06Q 10/10; G06Q 10/063118; G06Q 10/06395; G06Q 10/06398; G06Q 10/105; G06Q 40/02; G06Q 10/06312; G06Q 10/06313; G06Q 10/0633; G06Q 30/0201; G06Q 50/30; G06Q 40/00; G06Q 30/02; G06Q 30/0277; G06Q 50/01; G06Q 30/0275; G06Q 30/0205; G06Q 30/0244; G06Q 30/0251; G06Q 30/06; G06Q 40/06; G06Q 10/02; G06Q 10/04; G06Q 10/0635; G06Q 10/067; G06Q 10/101; G06Q 20/10; G06Q 20/102; G06Q 20/123; G06Q 30/0214; G06Q 30/0241; G06Q 30/0242; G06Q 30/0243; G06Q 30/0263; G06Q 30/0269; G06Q 30/0631; G06Q 40/025; G06Q 50/00; G06Q 50/06; G06Q 30/0207–0277
See application file for complete search history.

(56) References Cited

U.S. PATENT DOCUMENTS

| | | | | |
|---|---|---|---|---|
| 6,023,765 A | * | 2/2000 | Kuhn | G06F 21/6218 713/166 |
| 2008/0162068 A1 | * | 7/2008 | Victor | G06F 11/3684 702/108 |
| 2012/0054043 A1 | * | 3/2012 | Agarwal | G06Q 30/02 705/14.71 |

(Continued)

*Primary Examiner* — Chinyere Mpamugo
(74) *Attorney, Agent, or Firm* — Guntin & Gust, PLC; Kenneth Kwan

(57) ABSTRACT

Methods, systems, and apparatus, including computer programs encoded on a computer storage medium, for receiving, from a client device of a user, an ad request for an ad space of a seller, the ad space being for presentation in a user interface of an application executing on the client device, creating a bid request for bidding on the ad space, sending the bid request to one or more bidders, the bidders representing one or more buyers, receiving one or more bids from one or more of the bidders, each bid corresponding to a respective buyer and a creative, selecting, from the received bids, a winning bid corresponding to a particular buyer and a particular creative, and identifying a visibility profile for the particular buyer and, based thereon, providing data associated with the user to the particular buyer.

18 Claims, 3 Drawing Sheets

(56) References Cited

U.S. PATENT DOCUMENTS

2014/0006170 A1\* 1/2014 Collette ............ G06Q 30/0277
705/14.71
2014/0281993 A1\* 9/2014 Hyde ................ H04N 21/2541
715/719

\* cited by examiner

US 10,872,355 B2

CONTROLLING USER DATA VISIBILITY IN ONLINE AD AUCTIONS

BACKGROUND

This specification relates to online advertising and, more particularly, to advertisement space auctions.

Online display advertising delivers promotional messages to consumers by using visual advertisements (or "ads") in web pages. A publisher of a web page can insert an ad space in a web page. An ad space is a region of a web page (or other electronic document) where an advertisement can be placed. When the web page is displayed in a browser, a visual advertisement (a "creative") of an advertiser can be dynamically retrieved from an ad server for the advertiser, and displayed in the ad space. The act of serving a creative on a web page for displaying is often referred to as an impression.

An ad space inventory is a collection of one or more ad spaces on web pages served by a publisher's web sites. Publisher can sell their ad space inventories to advertisers. Multiple publishers and multiple advertisers can participate in auctions in which selling and buying of ad space inventories take place. Auctions can be conducted by an ad network or ad exchange that brokers between a group of publishers and a group of advertisers.

Selling and buying ad spaces can be based on pricing or payment models such as cost per thousand impressions (CPM), cost per click (CPC), and cost per action or acquisition (CPA). In the CPM model, advertisers typically pay for every impression of their advertisement; the price paid for each impression is measured in price per 1000 ("mille") impressions. In the CPC model, advertisers typically pay each time a viewer clicks on their advertisement. In the CPA model, advertisers pay for every action, such as a sale or registration, completed as a result of a viewer clicking on their advertisement.

SUMMARY

In general, one aspect of the subject matter described in this specification can be embodied in methods that include the actions of receiving, from a client device of a user, an ad request for an ad space of a seller, the ad space being for presentation in a user interface of an application executing on the client device, creating a bid request for bidding on the ad space, sending the bid request to one or more bidders, the bidders representing one or more buyers, receiving one or more bids from one or more of the bidders, each bid corresponding to a respective buyer and a creative, selecting, from the received bids, a winning bid corresponding to a particular buyer and a particular creative, and identifying a visibility profile for the particular buyer and, based thereon, providing data associated with the user to the particular buyer. Other embodiments of this aspect include corresponding systems, apparatus, and computer programs.

These and other aspects can optionally include one or more of the following features. The winning bid can be selected based on the visibility profile. The data associated with the user can comprise one or more identifiers of the client device or the application. The data associated with the user can comprise at least one of an identifier, age, gender, location, and behavior characteristic of the user. Providing data associated with the user to the particular buyer can be in response to processing of a tracking code included in the particular creative served to the ad space. The visibility profile can be determined based on a preexisting arrangement between the particular buyer and the seller. The visibility profile can comprise one or more decimal integers. The visibility profile can comprise one or more settings controlling access permission, for the particular buyer, to at least one of an identifier of the client device, an identifier of the application, an identifier of the user, age of the user, gender of the user, location of the user, and behavior characteristic of the user.

Particular implementations of the subject matter described in this specification can be implemented to realize one or more of the following advantages. The system described herein conducts in real-time an auction of an available ad space that is for presentation in a user interface of an application executing on a user's client device. The system sends a bid request for the ad space to multiple bidders representing respective buyers, and selects a bid from a particular buyer. The system identifies a visibility profile that sets access permission to data associated with the user, and provides some, all, or none of the data associated with the user to the particular buyer based on the visibility profile. In this way, user data such as user segment data is not exposed to a buyer through an ad space auction, such that the buyer is not able to use the user segment data for ad space biddings at a later time, or re-sell the user segment data to another party.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
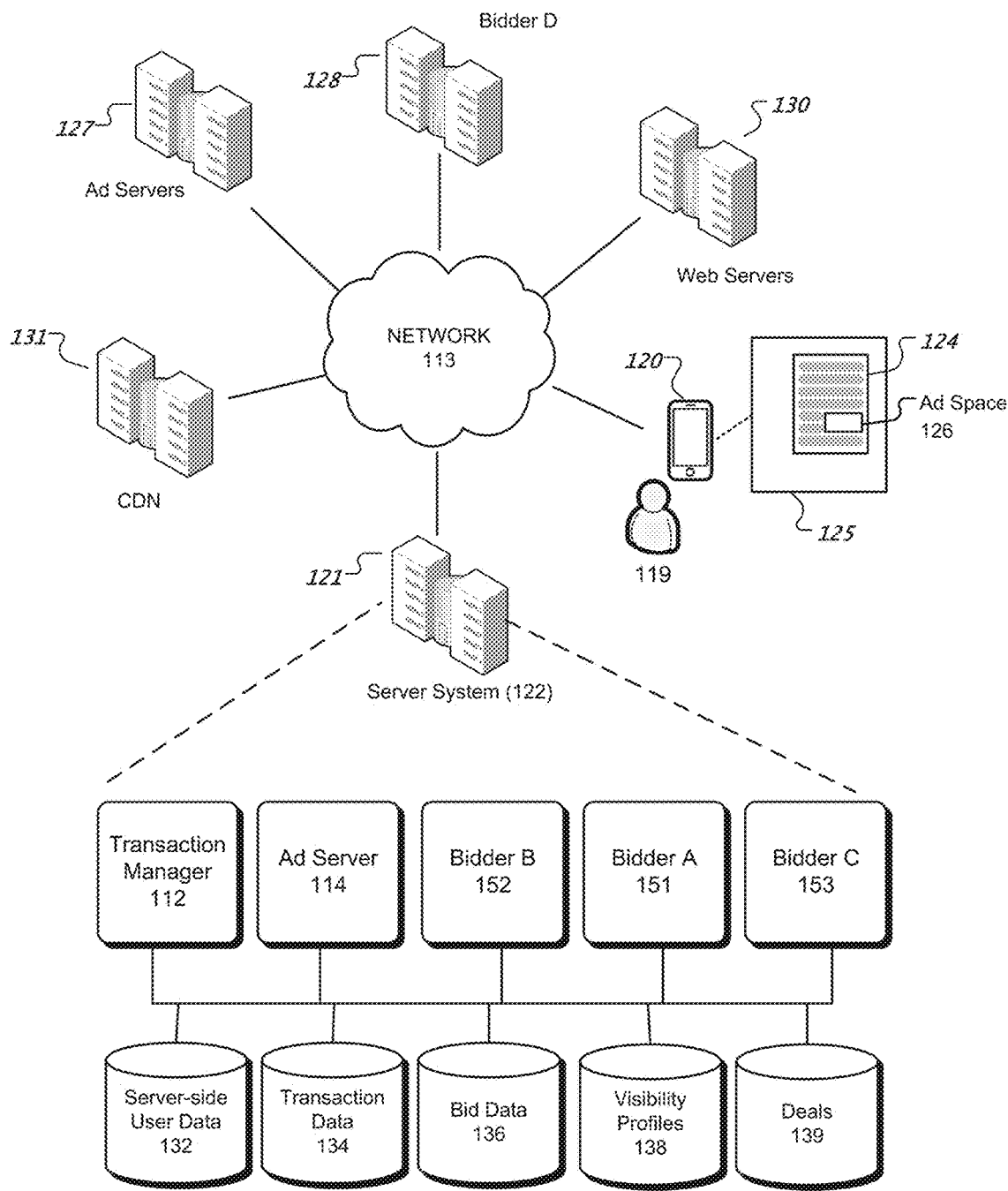
FIG. 1 illustrates an example system for ad space auctions.

FIG. 1 illustrates an example system 100 for ad space auctions. A server system 122 provides functionality for real-time ad space data packaging and auctions. The server system 122 comprises software components and databases that can be deployed at one or more data centers 121 in one or more geographic locations, for example. The server system 122 software components comprise a transaction manager 112, ad server 114, and one or more bidders (e.g., bidder A 151, bidder B 152, and bidder C 153). The server system 122 can also include one or more software components for load balancing tools and security tools. The load balancing tools manage traffic within a single data center or between multiple data centers. The security tools manage data protection and access privilege for tenants served by the data centers 121. The software components can comprise subcomponents that can execute on the same or on different individual data processing apparatus. The server system 122 databases comprise a server-side user data database 132, transaction data database 134, bid data database 136, visibility profiles database 138, and deals database 139. The databases can reside in one or more physical storage systems. The software components and databases will be further described below.

The transaction manager 112 ("impression bus" or simply "Imp Bus") is an auction system that facilitates the transaction aspects of ad space inventory and impression trading between buyers and sellers. A buyer can be an advertiser (e.g., a credit card company, a sportswear company), an ad network, or an advertising agency, for example. Other buyers are possible. A seller can be a publisher (e.g., newspaper or social network), an online streaming or gaming service, or an ad network. Other sellers are possible. The transaction manager 112 processes ad requests received from web browsers or other software applications displaying content from publishers, sends relevant information to advertisers, conducts auctions (e.g., on behalf of sellers), returns creatives to the browsers or other applications, keeps track of billing and usage for advertisers and publishers, returns auction-result data, and enforces quality standards, for example. The transaction manager 112 stores in the transaction data database 134 various transaction information for each ad space that is transacted by the transaction manager 112 or other software components of the server system 122.

The ad server 114 is a software component that serves creatives to web pages or other applications. The ad server 114 can also make decisions about what creatives to serve, and track clicks or other user interactions with creatives, for example. A creative can be a visual or audio advertisement such as an image, an animation, a video clip, or an audio clip. Other types of a creative are possible.

A bidder system or bidder (e.g., bidder A 151) is a software component that, on behalf of a buyer, performs bidding operations. The bidder takes various pieces of bid-specific information (e.g., maximal bid price, target user areas or segments, start and end dates, budget) as input and generates a bid for a particular item of an ad space inventory, for example. A buyer can set up (e.g., through an API or web pages provided by the server system 122) a campaign targeting an ad space inventory with a set of bid-specific information for the ad space inventory and store the bid-specific information in bid data database 136. In some implementations, a bidder can be remote from the server system 122, such as bidder D 128. Here, an ad space inventory can be a collection of one or more ad spaces on web pages served by a publisher's web site. An ad space inventory can also be a collection of one or more ad spaces in user interfaces presented by a software application published by a publisher. Other collections of ad spaces of an ad space inventory are possible.

The transaction manager 112 conducts an auction when receiving an ad request for filling an available ad space. By way of illustration, a graphical user interface 124 of a software application 125 executing on client device 120 of a user 119 can include an ad space 126 and a corresponding ad tag. The application 125 can be a web browser application, or a software application such as a game application or a maps application. For instance, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are possible. Here, the client device 120 can be a mobile phone, a smartwatch, a tablet computer, a personal computer, a game console, or an in-car media system. Other examples of a client device are possible.

In some implementations, an ad tag comprises a Uniform Resource Locator (URL) from which an ad will be requested (e.g., a URL for the server system 122), Hypertext Markup Language (HTML) statements and/or JavaScript instructions for retrieving and displaying a creative (e.g., displaying the creative in a 160×600 iframe). The application 125 running on the client device 120 can retrieve content in the user interface 124 (e.g., a web page) through one or more data communication networks 113 such as the Internet, for example, from web servers 130 of a publisher. The ad tag causes the application 125 to send (e.g., through the networks 113) an ad request ("ad call") to the server system 122. In some implementations, the application 125 sends an ad request to the server system 122 via another advertising server system such as an ad exchange. The ad request can include information about the available ad space 126 (e.g., a size for the ad space, an identifier for the publisher), user information (e.g., an identifier of the user 119, an Internet Protocol or IP address), and system information (e.g., types of the browser and the client device), for example. The ad request can be composed in JavaScript Object Notation (JSON) or Extensible Markup Language (XML) format and transmitted to the server system 122 using Hypertext Transfer Protocol (HTTP) protocol (e.g., using HTTP POST request method). Other ad request formats and transmission methods are possible.

In response to the ad request, the transaction manager 112 generates a bid request including information about the ad space, the user, and so on, and sends the bid request to multiple bidders such as bidder A 151 and bidder B 152. The transaction manager 112 can also send the bid request through the networks 113 to servers of bidder D 128, which is external to the server system 122. The bid request can be composed in JSON format and sent to bidders using HTTP POST. The bid request can also be encoded or compressed. Other bid request formats and transmission methods are possible.

Each bidder can determine an appropriate bid based on its own requirements (e.g., budget, targets in placements) and submit a bid response including a bid price and an identifier of a creative to be served, for example, to the transaction manager 112 (or not to respond at all). The transaction manager 112 determines a winning bid (e.g., a highest bid) among bid responses received within a specified time period (e.g., 100 milliseconds). The transaction manager 112 then returns a creative of the winning bid to the client device 120, causing the application 125 to display the creative in the ad space in the user interface 124. The transaction manager 112 can also return a URL for a creative of the winning bid to the client device 120, causing the application 125 on the client device 120 to retrieve the creative from an ad server (e.g., ad server 114, or ad servers 127 external to the server system 122), or from servers of a content distribution network (CDN) 131. In various implementations, the transaction manager 112 can store in the transaction data database 134 transaction information such as an identifier of the creative served to the ad space, an identifier of the winning buyer, the user's identifier, the winning bid price, an identifier of the ad space, an identifier of the seller of the ad space, and a time stamp. The winning bid price (i.e., the price paid by the winning buyer) can be the bid price submitted by the winning buyer, or a second highest bid price of the auction as determined by Vickrey auction or other second-price auction mechanisms. Other transaction information of a transaction is possible.

A seller can negotiate with a buyer and reach an agreement or arrangement on pricing or other terms on an ad space inventory available from the seller. The seller or the buyer can create (e.g., through an API or a web page provided by the server system 122) a deal (e.g., implemented as a data object) for the agreed-upon arrangement and store the deal in the deals database 139. A deal stored in the deals database 139 can include an identifier for seller, an identifier for a buyer, an identifier for the deal ("deal ID"), an identifier of an ad space inventory from the seller, and a floor price for an ad space in the ad space inventory. The floor price specifies a minimal bid price for the buyer. The deal can also include flight dates (start and ending dates for the deal), one or more user target segments, and an auction type. The auction type specifies whether the deal is private or public. For the private auction type, auctions for ad spaces of the deal are open only to buyers having agreements with the seller on the deal's corresponding ad space inventory. For the public auction type, auctions for ad spaces of the deal are open to every eligible buyer and not limiting to buyers having agreements with the seller on the deal's corresponding ad space inventory.

A buyer of a deal on an ad space inventory can set up a campaign targeting the ad space inventory with the deal's identifier and bid-specific information (e.g., the deal's floor bid price and user target segments) and store the deal's identifier and bid-specific information in the bid data databases 136. When receiving a bid request including the deal's identifier, i.e., a bid request for an ad space of the ad space inventory of the deal, a bidder (e.g., bidder B 152) can carry out the campaign on behalf of the buyer by accessing the bid-specific information stored in the bid data database 136 based on the deal's identifier, and generating a bid on the ad space based on the corresponding bid-specific information, for example.

Various data can be associated with the user 119 in the system 100 for ad space auctions illustrated in FIG. 1. Data associated with the user 119 include identifiers for the user 119, user segment data associated with the user 119, and user behavioral data associated with the user 119. Other data associated with the user 119 are possible.

An identifier for the user 119 can be an internal identifier used by the server system 122 for identifying the user 119, an internal identifier used by the seller of the ad space 126 to identify the user 119, or an internal identifier used by the buyer for identifying the user 199. An identifier for the user 119 can also be an internal identifier used by a third-party system (e.g., another ad network) to identify the user 119. An identifier for the user 119 can also be an identifier for the application 125, an identifier for an operating system of the client device 120, or an identifier for the client device 120 (e.g., Universally Unique Identifier or UUID). Other identifiers for the user 119 are possible.

User segment data associated with the user 119 include demographic information such as age, gender, location (e.g., street address, city, state, zip code, time zone, or latitude and longitude coordinates), school, and work of the user 119. Other user segment data are possible.

User behavioral data associated with the user 119 include data associated with the user's online activities such as, for example, websites that the user visited, actions that the user took such as making online purchases or adding items to a wish list or electronic shopping cart of an electronic store, the user's search engine search history, and a frequency that the user accessed an application such as a streaming music application. Other user behavioral data are possible.

A seller (e.g., a publisher) or the server system 122 can obtain data associated with the user 119 from the user or the user's client device 120. For instance, user segment data such as demographic information can be provided by a user to a publisher when the user accesses websites or applications published by the publisher. A publisher or the server system 122 can determine location data of the user 119 by determining an Internet Protocol or IP address associated with the client device 120. User behavioral data can be collected by code executed by an application (e.g., application 125) on a user's client device (e.g., client device 120). User behavioral data can also be collected by websites or applications by a publisher. A seller or the server system 122 can store data associated with the user 119 in the server-side user data database 132 (or at the seller's server system), for example. In this way, when an ad space associated with the user becomes available, the server system 122 can access the server-side user data database 132 and include in a bid request for the ad space targeting information such as user segment or behavioral data that is associated with the user.

A buyer of the ad space 126 can obtain data associated with the user 119 through transaction information for bidding on the ad space 126. For instance, as described above, a bid request on the ad space 126 can have user targeting information such as user segment data. If a buyer won the bidding on the ad space 126, the buyer can access the corresponding transaction record stored in the transaction data database 134 for data associated with the user 119 such as a user identifier of the user 119 and user segment data (e.g., male users between 20 and 40 years old) of the user 119. In this way, the buyer can determine a mapping (an association) between the user 119 (as represented by the user identifier) and a corresponding user segment that the buyer can use for ad space biddings at a later time. For instance, the buyer can store the mapping (i.e., data associated with the user 119) in the server-side user data database 132 or at another server system.

A buyer of the ad space 126 can obtain data associated with the user 119 through a tracking code included with a creative served to the ad space 126. The tracking code can be a browser cookie, expandable macro, or conversion pixel. Other types of tracking codes are possible. When the creative is served to the ad space 126, the tracking code can cause the ad server 114 (or the transaction manager 112) to obtain existing data associated with the user 119 from the server-side user data database 132, and send the data associated with the user 119 to the buyer's server system. For instance, the tracking code ("expandable macro") can specify user attribute fields (e.g., ${USER_ID}, ${CITY}, ${STATE}) that can instruct the ad server 114 to fill in values of the user attribute fields (e.g., "123abc45def", "Palo Alto", "CA") and provide the values to the buyer's server system (or store the values in the server-side user data database 132 as part of the transaction record).

In various implementations, the application 125 can process the tracking code and can access functions (e.g., clock function, system service function, Global Positioning System or GPS function) or other applications on the client device 120 for data associated with the user 119 (e.g., time zone, UUID, latitude and longitude coordinates), and send a server call-back (e.g., using HTTP POST) to the buyer's server system with the data associated with the user 119.

When combined with data associated with the user 119 such as a particular user segment (e.g., female shoppers between ages 20 and 50 residing in California), the ad space 126 can potentially command higher bid prices from advertisers who want to target the particular user segment. However, a buyer can target the user 119 without paying for a higher bid price for data associated with the user 119, if the buyer already learned about the user's segments from previous transactions associated with the user 119, as described earlier. To prevent data associated with a user is "leaked" to a buyer through transactions, particular implementations of the subject matter described in this specification describes methods for controlling user data visibility in ad space auctions. Particular implementations utilize a visibility profile that specifies one or more types or pieces of user data that can be shared with (visible to) with a buyer through ad space transactions.

A seller (e.g., a publisher or an ad network) of an ad space inventory can create a visibility profile specifying one or more types (or pieces) of user data associated with ad spaces of the ad space inventory that can be shared with buyers of ad spaces of the ad space inventory. A visibility profile can also be specific to a buyer.

A visibility profile can comprise a flag or a flag word. For instance, a flag of a visibility profile can specify whether all user data associated with an ad space is visible to a buyer of the ad space (e.g., with a flag value of 1), or none of the data associated with the user data associated with the ad space is allowed to be shared with a buyer of the ad space (e.g., with a flag value of 0).

As for another example, a flag word of a visibility profile can be a decimal integer (e.g., 006). The decimal integer corresponds to a binary number (e.g., 00000110) where each digit of the binary number sets visibility or access permission for a buyer to a particular type or piece of user data. By way of illustration, digits of an 8-digit-binary-number visibility profile can set visibility for age, gender, an internal user identifier for the server system 122, city, state, time zone, device identifier, and IP address. The binary number 00000110 (corresponding to the flag word 006) sets a visibility permission such that only time zone and a device identifier (e.g., UUID) associated with an ad space is visible to a buyer of the ad space.

A visibility profile of an ad space inventory can be stored as a data object in the visibility profiles database 138. In various implementations, a visibility profile can be stored in the deals database 138 as part of a deal data object that contains terms of an existing arrangement between a seller of an ad space inventory and one or more buyers.

Figure 2:
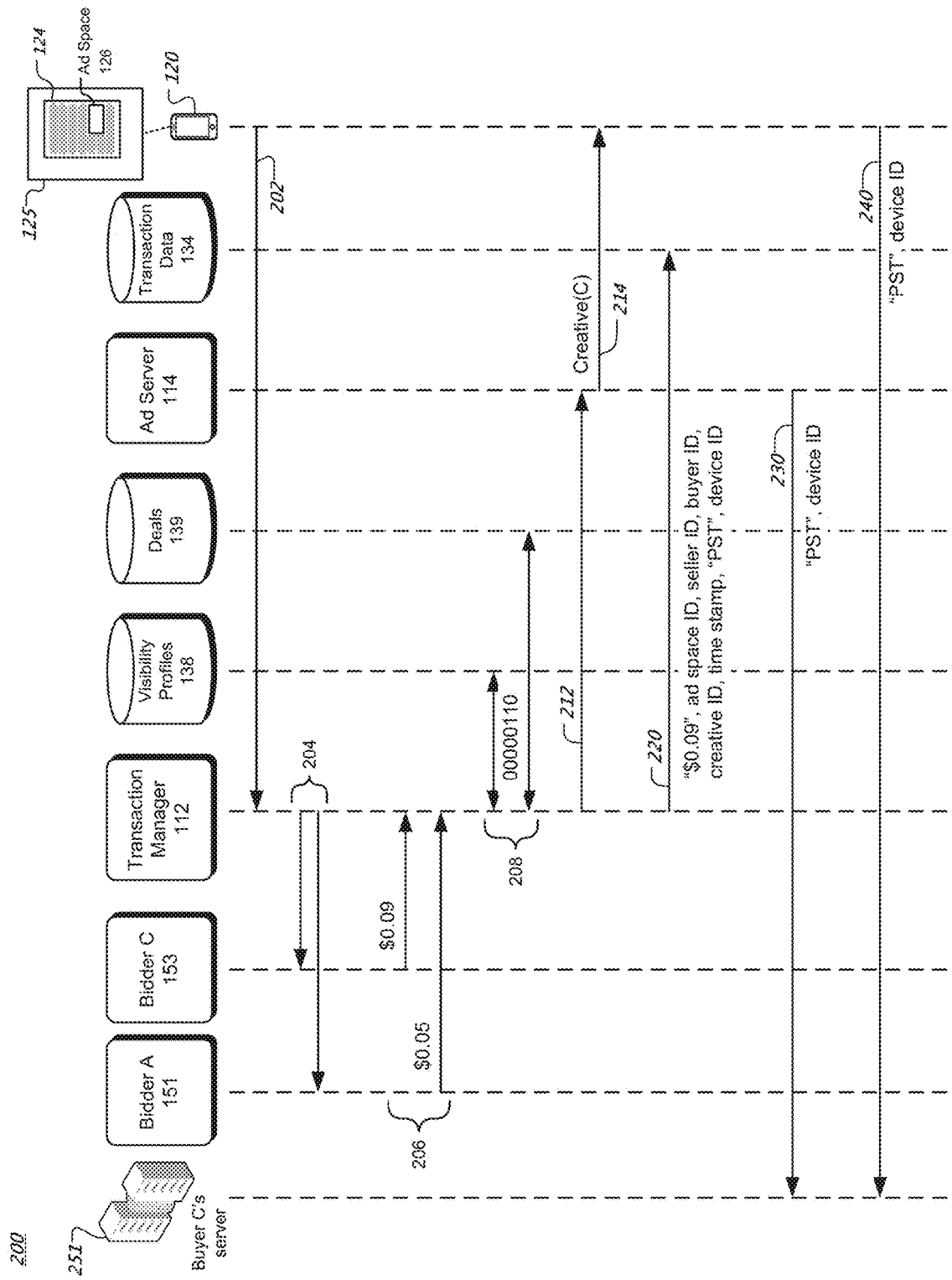
FIG. 2 is a data flow diagram for an example method for controlling user data visibility in an ad space auction.

FIG. 2 is a data flow diagram of an example method for controlling user data visibility in an ad space auction. For convenience of illustration, prices described hereon are based on the CPM pricing model. Other pricing models are possible. In FIG. 2, the transaction manager 112 receives an ad request (202) for an ad space 126 that is for presentation in the user interface 124. In response to the ad request 202, the transaction manager 112 sends to multiple bidders a bid request (204) requesting a bid on the ad space 126. The bid request 204 includes an identifier of the ad space 126 and a size of the ad space 126, for example. The bid request 204 can also include one or more deal IDs for deals that are eligible for the ad space 126. The bid request 204 can be composed in JSON format and transmitted to bidders using HTTP POST, as described earlier.

By way of illustration, the transaction manager 112 receives respective bids (in response to the bid request 204) from the bidder A and bidder C (206). Each bid includes a bid price, an identifier of a buyer, and an identifier of a creative from the buyer. A bid can also include a deal ID indicating bidding based on a corresponding deal. Here, assume that bidder A (e.g., representing buyer A) submits a bid price of $0.05 on the ad space 126. Bidder C submits a bid price of $0.09 on the ad space 126.

From the received bids, the transaction manager 112 selects the $0.09 bid from the buyer C as the winning bid. The transaction manager 112 can access the visibility profiles 138 or the deals database 139 (if the winning bid is based on an eligible deal) for a visibility profile for the ad space 126 (208). For instance, the visibility profile can be the binary number 00000110 (corresponding to the flag word 006) described earlier that allows only the time zone of the user 119 and a device identifier of the client device 120 to be shared with the buyer C. As for another example, the visibility profile can be the flag 0 described earlier that does not allow data associated with the user 119 to be shared with the buyer C. That is, the data associated with the user 119 is completed blocked from the buyer C.

The transaction manager 112 can select a winning bid based on the visibility profile. For instance, if the transaction manager 112 determines that the buyer C's creative (e.g., based on the creative's registration information with the server system 122) includes tracking code that, when processed by the application 125 or the ad server 114, can collect user data (e.g., IP address) that are not allowed by the visibility profile, the transaction manager 112 can discard the buyer C's bid and select another bid that satisfies the visibility profile for the ad space 126.

After selecting the buyer C's bid as the winning bid, the transaction manager 112 sends a message to the ad server 114 (212) and instructs the ad server to send to the client device 120 the buyer C's creative for presentation in the ad space 126 (214).

The transaction manager 112 stores in the transaction data database 134 a transaction record for the transaction of the ad space 126. The transaction record includes the bid price $0.09, identifiers for the ad space 126, the ad space's seller, the buyer C, and the creative, and a time stamp, for example. Based on the visibility profile (e.g., the binary number 00000110) for the ad space 126, the transaction manager 112 can access the server-side user data database 132 for the user's time zone (e.g., Pacific Standard Time or PST) and an identifier for the client device 120, and include the user's time zone and the device identifier in the transaction record (220).

When permitted by the visibility profile (e.g., as determined by the transaction manager 112 as described earlier), the tracking code included with the buyer C's creative can be processed by the ad server 114 to cause the ad server 114 to access the server-side user data database 132 and send to the buyer C's server 251 the user's time zone (e.g., PST) and an identifier of the client device 120 to the buyer C's server 251 (230). Similarly, the tracking code included with the buyer C's creative can cause the application 125 (or another software application running on the client device 120) to access the client device's functions and send to the buyer C's server 251 the user's time zone (e.g., PST) and an identifier for the client device 120 to the buyer C's server 251 (240).

Figure 3:
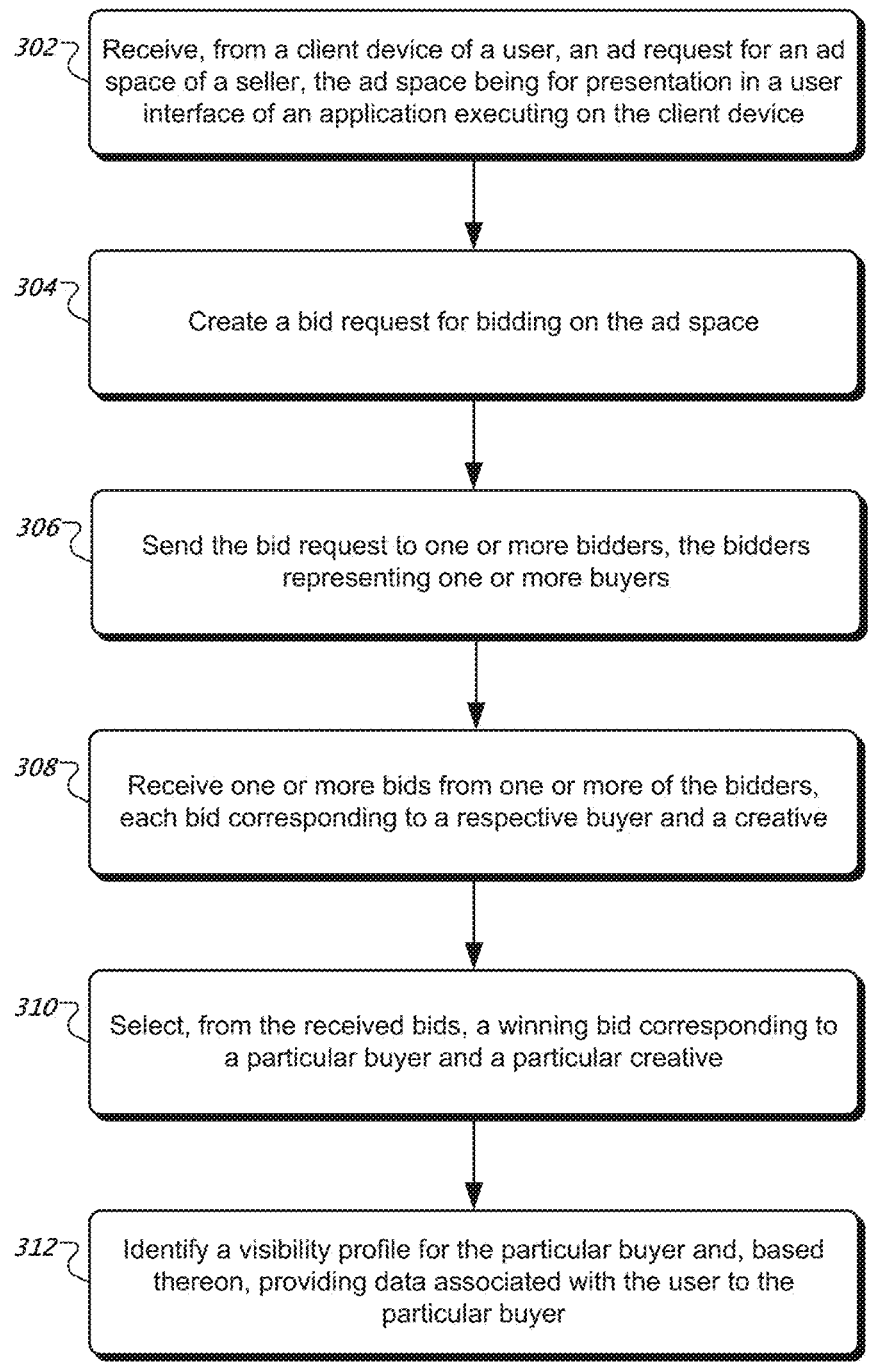
FIG. 3 is a flowchart of another example method for controlling user data visibility in an ad space auction.

FIG. 3 is a flowchart of another example method for controlling user data visibility in an ad space auction. The method can be implemented using software components executing on one or more data processing apparatus that are part of the server system 122 described earlier. For instance, the method can be implemented by the transaction manager 112. The method begins by receiving, from a client device of a user, an ad request for an ad space of a seller, the ad space being for presentation in a user interface of an application executing on the client device (302). The method creates a bid request for bidding on the ad space (304). The method sends the bid request to one or more bidders (e.g., bidder A and bidder C), the bidders representing one or more buyers (306). The method receives one or more bids from one or more of the bidders, each bid corresponding to a respective buyer and a creative (308). The method selects, from the received bids, a winning bid corresponding to a particular buyer and a particular creative (310). The method identifies a visibility profile for the particular buyer and, based thereon, providing data associated with the user to the particular buyer (312).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user, for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving, by a server system including processors, from a client device of a user, an ad request for an ad space of a seller, the ad space of the seller being for presentation in a user interface of an application executing on the client device of the user, wherein the application comprises a web browser application or a software application;

creating, by the server system, a bid request for bidding on the ad space of the seller;

sending, by the server system, the bid request to a plurality of bid servers at the server system;

receiving, by the server system, a plurality of bids from the plurality of bid servers at the server system responsive to the bid request;

accessing, by the server system, from a visibility profile database at the server system, a first visibility profile associated with a first bid of the plurality of bids from a first bid server of the plurality of bid servers and a second visibility profile associated with a second bid of the plurality of bids from a second bid server of the plurality of bid servers, wherein the first visibility profile comprises a first flag word corresponding to a first binary number and the second visibility profile comprises a second flag word corresponding to a second binary number, wherein each digit of the first binary number and the second binary number each control visibility or access permission a particular type or piece of data associated with the user;

accessing, by the server system, an advertising server at the server system to retrieve a first tracking code associated with a first creative of a first buyer corresponding to the first bid and a second tracking code associated with a second creative of a second buyer corresponding to the second bid;

determining, by the server system, whether the first tracking code collects any item of data not permitted to be visible to the first buyer according to the first binary number of the first visibility profile associated with the first buyer corresponding to the first bid;

discarding, by the server system, the first bid of the first bid server responsive to the determining that the first tracking code collects any item of data not permitted to be visible to the first buyer according to the first binary number;

determining, by the server system, whether the second tracking code collects any item of data not permitted to be visible to the second buyer according to the second binary number of the second visibility profile associated with the second buyer corresponding to the second bid;

selecting, by the server system, the second bid of the second bid server as a winning bid responsive to determining that the second tracking code associated with the second bid does not collect any item of data not permitted to be visible to the second buyer according to the second binary number, wherein the winning bid corresponds to the second buyer and a second creative;

accessing, by the server system, a plurality of items of data associated with the user of the client device from a server-side user database at the server system;

determining, by the server system, a first data item of the plurality of items of data associated with the user that are permitted to be visible to the second buyer based on a digit of the second binary number associated with the second buyer and corresponding to the first data item; and providing, by the server system, the first data item of the plurality of items of data associated with the user to the second bid server of the plurality of bid servers at the server system according to the determining that the first data item is permitted to be visible to the second buyer.

2. The method of claim 1, wherein the second bid is selected as the winning bid based on a second visibility profile associated with the second bid, and further comprising storing, by the server system, a transaction record in a database responsive to the providing the first data item to the second bid server.

3. The method of claim 2 wherein the plurality of items of data associated with the user comprises an identifier of the user client device, an identifier of the application, or any combination thereof, and wherein the transaction record includes a bid price, seller ad space information, or any combination thereof.

4. The method of claim 1, wherein the plurality of items of data associated with the user comprises an identifier, an age, a gender, a location, or behavior characteristic of the user, or any combination thereof.

5. The method of claim 1, wherein the providing the first data item associated with the user to the second bid server is further in response to processing of a second tracking code included in the second creative served to the ad space of the seller.

6. The method of claim 1, wherein the first visibility profile is based on a preexisting arrangement between the first buyer and the seller.

7. The method of claim 1, wherein the first visibility profile comprises a plurality of settings controlling access permission, for the first buyer, to an identifier of the user client device, an identifier of the application, an identifier of the user, an age of the user, a gender of the user, a location of the user, a behavior characteristic of the user, or any combination thereof.

8. A server system, comprising:
a processing system including processors; and
a memory that stores executable instructions that, when executed by the processing system, facilitate performance of operations comprising:
receiving, from a client device of a user, an ad request for an ad space of a seller, the ad space of the seller being for presentation in a user interface of an application executing on the client device of the user, wherein the application comprises a web browser application or a software application;
creating a bid request for bidding on the ad space of the seller;
sending the bid request to a plurality of bid servers at the server system;
receiving a plurality of bids from the plurality of bid servers at the server system responsive to the bid request;
accessing, from a visibility profile database at the server system, a first visibility profile associated with a first bid of the plurality of bids from a first bid server of the plurality of bid servers and a second visibility profile associated with a second bid of the plurality of bids from a second bid server of the plurality of bid servers, wherein the first visibility profile comprises a first flag word corresponding to a first binary number and the second visibility profile comprises a second flag word corresponding to a second binary number, wherein each digit of the first binary number and the second binary number each control visibility or access permission a first type or first piece of data associated with the user;
accessing an advertising server at the server system to retrieve a first tracking code associated with a first creative of a first buyer corresponding to the first bid and a second tracking code associated with a second creative of a second buyer corresponding to the second bid;
determining whether the first tracking code collects any item of data not permitted to be visible to the first buyer according to the first binary number of the first visibility profile associated with the first buyer corresponding to the first bid;
discarding the first bid of the first bid server responsive to the determining that the first tracking code collects any item of data not permitted to be visible to the first buyer according to the first binary number;
determining, by the server system, whether the second tracking code collects any item of data not permitted to be visible to the second buyer according to the second binary number of the second visibility profile associated with the second buyer corresponding to the second bid;
selecting the second bid of the second bid server as a winning bid responsive to determining that the second tracking code associated with the second bid does not collect any item of data not permitted to be visible to the second buyer according to the second binary number, wherein the winning bid corresponds to a second buyer and a second creative;
accessing a second visibility profile from the visibility profile database of the server system, wherein the second visibility profile comprises a second flag word corresponding to a second binary number, wherein each digit of the second binary number sets visibility or access permission for the second buyer corresponding to the winning bid to a second type or second piece of data associated with the user;
accessing a plurality of items of data associated with the user of the client device from a server-side user database at the server system;
determining a first data item of the plurality of items of data associated with the user that are permitted to be visible to the second buyer based on a digit of the second binary number corresponding to the first data item; and
providing the first data item of the plurality of items of data associated with the user to the second bid server of the plurality of bid servers at the server system according to the determining that the first data item is permitted to be visible to the second buyer.

9. The server system of claim 8, wherein the second bid is selected as the winning bid based on the second visibility profile associated with the second bid.

10. The server system of claim 8, wherein the first data item of the plurality of items of data associated with the user comprises an identifier of the user client device, an identifier of the application, or any combination thereof.

11. The server system of claim 8, wherein the plurality of items of data associated with the user comprises an identifier, an age, a gender, a location, or behavior characteristic of the user, or any combination thereof.

12. The server system of claim 8, wherein the providing the first data item associated with the user to the second bid server is further in response to processing of a second tracking code included in the second creative served to the ad space of the seller.

13. The server system of claim 8, wherein the first visibility profile is based on a preexisting arrangement between the first buyer and the seller.

14. The server system of claim 8, wherein the first visibility profile comprises a plurality of settings controlling access permission, for the first buyer, to an identifier of the user client device, an identifier of the application, an identifier of the user, an age of the user, a gender of the user, a location of the user, a behavior characteristic of the user, or any combination thereof.

15. A non-transitory machine-readable storage medium, comprising executable instructions that, when executed by a server system including processors, facilitate performance of operations, comprising:
   receiving, from a client device of a user, an ad request for an ad space of a seller, the ad space of the seller being for presentation in a user interface of an application executing on the client device of the user, wherein the application comprises a web browser application or a software application;
   creating a bid request for bidding on the ad space of the seller;
   sending the bid request to a plurality of bid servers at the server system;
   receiving a plurality of bids from the plurality of bid servers at the server system responsive to the bid request;
   accessing, from a visibility profile database at the server system, a first visibility profile associated with a first bid of the plurality of bids from a first bid server of the plurality of bid servers and a second visibility profile associated with a second bid of the plurality of bids from a second bid server of the plurality of bid servers, wherein the first visibility profile comprises a first flag word corresponding to a first binary number and the second visibility profile comprises a second flag word corresponding to a second binary number, wherein each digit of the first binary number and the second binary number each control visibility or access permission a first type or first piece of data associated with the user;
   accessing an advertising server at the server system to retrieve a first tracking code associated with a first creative of a first buyer corresponding to the first bid and a second tracking code associated with a second creative of a second buyer corresponding to the second bid;
   determining whether the first tracking code collects of data not permitted to be visible to the first buyer according to the first binary number of the first visibility profile associated with the first buyer corresponding to the first bid;
   determining, by the server system, whether the second tracking code collects any item of data not permitted to be visible to the second buyer according to the second binary number of the second visibility profile associated with the second buyer corresponding to the second bid;
   selecting the second bid of the second bid server as a winning bid responsive to determining that the second tracking code associated with the second bid does not collect any item of data not permitted to be visible to the second buyer according to the second binary number, wherein the winning bid corresponds to a second buyer and a second creative;
   accessing a second visibility profile from the visibility profile database of the server system, wherein the second visibility profile comprises a second flag word corresponding to a second binary number, wherein each digit of the second binary number sets visibility or access permission for the second buyer corresponding to the winning bid to a second type or second piece of data associated with the user;
   accessing a plurality of items of data associated with the user of the client device from a server-side user database at the server;
   determining a first data item of the plurality of items of data associated with the user that are permitted to be visible to the second buyer based on a digit of the second binary number corresponding to the first data item; and
   providing the first data item of the plurality of items of data associated with the user to the second bid server of the plurality of bid servers at the server system according to the determining that the first data item is permitted to be visible to the second buyer.

16. The non-transitory machine-readable storage medium of claim 15, wherein the second bid is selected as the winning bid based on the second visibility profile associated with the second bid.

17. The non-transitory machine-readable storage medium of claim 15, wherein the plurality of items of data associated with the user comprises an identifier of the user client device, an identifier of the application, or any combination thereof.

18. The non-transitory machine-readable storage medium of claim 15, wherein the plurality of items of data associated with the user comprises an identifier, an age, a gender, a location, a behavior characteristic of the user, or any combination thereof.

* * * * *